241. SOLID MATERIAL COMMINUTION
OR DISINTEGRATION
273
S. F. HODGE.
Ore Crushing Machine.
A. I.
No. 236.
A. I. Patented May 17, 1859.
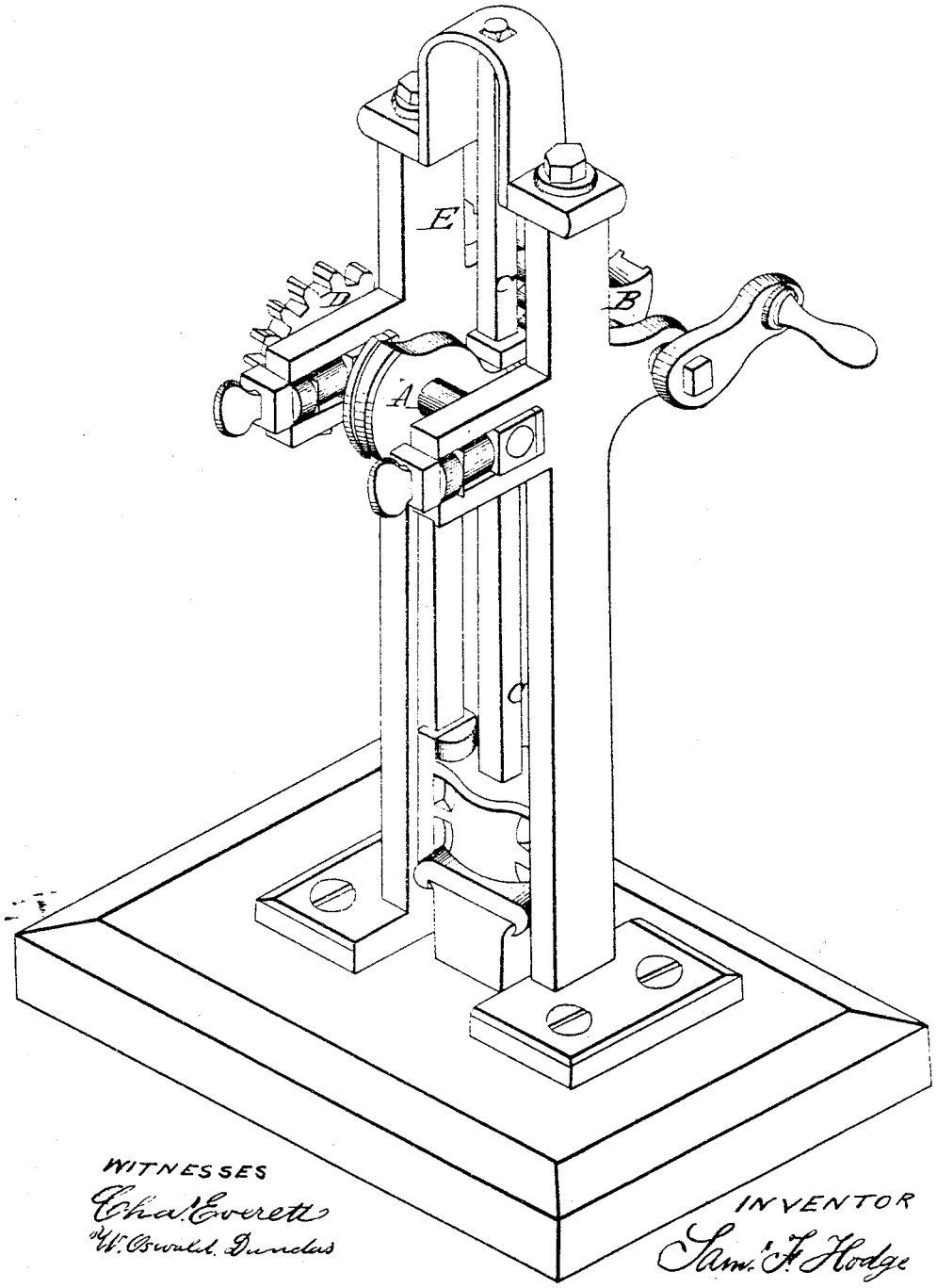
WITNESSES
Chas. Everett
W. Bowell Dundas
INVENTOR
Sam'l F. Hodge
N. PETERS, Photo-Lithographer, Washington, D. C.